United States Patent [19]

Baker et al.

[11] Patent Number: 5,376,743
[45] Date of Patent: Dec. 27, 1994

[54] PROCESS FOR THE PRODUCTION OF STICKY POLYMERS

[75] Inventors: Edgar C. Baker, Bridgewater, N.J.; Jose F. Cevallos-Candau; Fathi D. Hussein, both of Charleston, W. Va.; Kiu H. Lee, South Charleston, W. Va.; Allen Noshay, East Brunswick, N.J.

[73] Assignee: Union Carbide Chemicals & Plastics Technology Corporation, Danbury, Conn.

[21] Appl. No.: 29,821

[22] Filed: Mar. 11, 1993

[51] Int. Cl.$^5$ .................. C08F 2/34; C08F 210/06
[52] U.S. Cl. ........................ 526/88; 526/129; 526/153; 526/168; 526/335; 526/901; 526/904
[58] Field of Search ............... 526/74, 88, 129, 153, 526/168, 335, 901, 904

[56] References Cited

U.S. PATENT DOCUMENTS

| | | | |
|---|---|---|---|
| 4,640,907 | 2/1987 | Best | 502/115 |
| 4,970,279 | 11/1990 | Bailly et al. | 526/63 |
| 4,994,534 | 2/1991 | Rhee et al. | 526/88 |
| 5,063,110 | 11/1991 | Bailly et al. | 428/402 |
| 5,087,522 | 2/1992 | Bailly et al. | 428/402 |
| 5,165,998 | 11/1992 | Bailly et al. | 428/407 |
| 5,208,303 | 5/1993 | Bailly | 526/125 |

Primary Examiner—Joseph L. Schofer
Assistant Examiner—David Wu
Attorney, Agent, or Firm—Saul R. Bresch

[57] ABSTRACT

A process for the production of EPM or EPDM comprising contacting ethylene, propylene, and, optionally, one or more dienes, in a fluidized bed, at a temperature at or above the sticking temperature of the product resin, under polymerization conditions, with (i) a prepolymer containing a transition metal catalyst precursor with the proviso that the prepolymer is not sticky at the process temperature;
(ii) a hydrocarbyl aluminum and/or a hydrocarbyl aluminum halide cocatalyst,; and, optionally,
(iii) a halocarbon promoter; and, optionally,
(iv) an inert particulate material having a mean particle size in the range of about 0.01 to about 150 microns wherein the particulate material is either contained in the prepolymer or is independent of the prepolymer, wherein the amount of prepolymer or the combined amount of prepolymer and inert particulate material is sufficient to essentially prevent agglomeration of the fluidized bed and the product resin.

7 Claims, No Drawings

PROCESS FOR THE PRODUCTION OF STICKY POLYMERS

TECHNICAL FIELD

This invention relates to the production of sticky polymers, particularly elastomers having a crystallinity of less than about, 10 percent by weight.

BACKGROUND INFORMATION

The production of amorphous EPR elastomers in a gas phase fluidized bed process above their sticking temperatures is difficult due to agglomeration of the sticky, granular resin bed particles under polymerization conditions.

The term "sticky polymer" is defined as a polymer-which, although particulate at temperatures below the sticking temperature, agglomerates at temperatures at or above the sticking temperature. The term "sticking temperature", which, in the context of this specification, concerns the sticking temperature of particles of polymer in a fluidized bed, is defined as the temperature at which fluidization ceases due to the agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into aggregates of much larger size than the original particles and not flow out of the relatively small openings in the bottom of product discharge ranks or purge bins. Polymers of this type show acceptable fluidity in a gas phase fluidized bed reactor; however, once motion ceases, the additional mechanical force provided by the fluidizing gas passing through the distributor plate is insufficient to break up the aggregates which form and the bed will not refluidize. These polymers are classified as those, which have a minimum bin opening for free flow at zero storage time of up to two feet and a minimum bin opening for free flow at storage times of greater than five minutes of 4 to 8 feet or more.

Because of the tendency to agglomerate, sticky polymers are difficult to produce in typical gas phase processes, which are usually carried out in fluidized beds. Both economic and safety/environmental considerations indicate, however, that fluidized bed type polymerization is preferred for the manufacture of polymers that can exist in a granular, fluidizable form.

Although polymers that are sticky can be produced in non-gas phase processes, there are certain difficulties associated with the production of such products in, for example, slurry or bulk monomer polymerization processes. In such processes, the diluent or solvent is present in the resins exiting the reaction system at a high concentration leading to severe resin purging problems, particularly if the material in question is a low molecular weight resin or a very low crystallinity resin. Environmental considerations are such that the dissolved monomers and diluent must be removed from the polymer prior to its exposure to air. Safety also dictates the removal of residual hydrocarbons so that closed containers containing the polymers will not exceed safe volatiles levels in the gas head space over the resin. The safety and environmental concerns are accompanied by a definite economic factor in determining a preference for a gas phase fluid bed reaction system. The low number of moving parts and the relative lack of complexity in a basic fluidized bed process enhances the operability of the process and typically results in lower costs of production. Low costs of production are due, in part, to low volumes of recycled process streams and a high unit throughput.

Three major process types have been used for the production of some or all of these sticky resins, i.e., the bulk monomer slurry process; the diluent slurry process; and the solution process. All of these processes, although suitable for the production of many different types of polymers have deficiencies that are not present in the fluidized bed reaction system. The absence of large volumes of solvent or liquid monomer increases the safety of the system. The granular nature of the resultant polymer increases the flexibility of the system in that both granular resin and compounded resin can be delivered to the customer. The granular, porous nature of the polymer also facilitates purging of unwanted monomer to environmentally safe levels. A wide range of molecular weights can be produced in a fluidized bed, i.e., from ultrahigh molecular weights having a melt index of less than 0.001 gram per 10 minutes to relatively low molecular weights having a melt index of up to 100 grams per 10 minutes. Melt index is measured under ASTM D-1238, Condition E, at 190° C., and reported as grams per 10 minutes. The high heat removal capacity of a fluidized bed (due to the circulation of the fluidizing gas) and the ability to control reaction concentrations without the limitations imposed by the solubility of components such as hydrogen in the diluent are also desirable features of the fluidized bed process.

It is clear, then, that the production of polymer by means of a fluidized bed reaction system is advantageous. A typical system of this type is described in U.S. Pat. No. 4,482,687. Unfortunately, this system requires that the granular product be free-flowing. Industry has generally dealt with the problem of sticky polymers by avoiding operating regimes at or above the sticking temperature of the polymer. Low pressure polymerization of olefins in a gas phase reactor using transition metal catalysts is generally performed at temperatures below 120° C. Where high levels of comonomers are used in combination with ethylene and crystallinity levels are reduced below 30 percent by weight, the sticking temperature of the olefin polymer can be close to the polymerization temperature. Under such conditions, in either a fluidized bed or a stirred gas/solid phase reactor, stickiness of the resin particles becomes a problem. The stickiness problem becomes even more critical with copolymers of ethylene and propylene (EPMs) and ethylene/propylene/diene/terpolymers (EPDMs) having a crystalline content of less than about 10 percent by weight. These particular polymers are also known as EPRs, i.e., ethylene/propylene copolymer rubbers. Commercially desirable EPMs and EPDMs contain about 20 to about 55 percent by weight propylene and the EPDMs contain about 2 to about 15 percent by weight ethylidene norbornene (ENB).

EPRs are practically amorphous with glass transition temperatures of minus 50° C. to minus 60° C. At temperatures above the glass transition temperature, EPM and EPDM are rubbers whose viscosity decreases, like all rubbers, exponentially with increases in temperature. This viscosity decrease with rising temperatures is a major obstacle in the fluidized bed production of EPR because agglomeration increases as particle surface viscosity decreases.

At temperatures above about 30° C., amorphous EPM particles become so sticky that fluidized bed polymerization cannot be carried out reliably. EPDM particles are even stickier than EPM due to the presence of soluble liquid dienes such as ethylidene norbornene.

The stickiness problem can be reduced in a fluidized bed by the introduction of a fluidization aid, and this is described in U.S. Pat. No. 4,994,534. While this procedure is generally effective, it is deficient in the preparation of amorphous or nearly amorphous resins at temperatures at or above their sticking temperatures, i.e., under conditions of maximum stickiness. In this case, large quantities of the fluidization aid, about 15 to about 50 percent by weight based on the weight of the final product, are required. This, in turn, increases the cost of material; requires large quantities of fluidization aid; to be treated to ensure inertness; reduces the polymer throughput of the reactor; increases residues; limits the end use applications of the resin; can affect polymer properties in an undesirable way, e.g., by increasing block or gel formation; and imposes various other economic penalties.

The problem lies, then, in how to produce essentially amorphous or nearly amorphous EPRs at temperatures at or higher than their sticking temperatures, since the higher the temperature the greater the productivity, while at the same time reducing the amount of fluidization aid and, thus, fluidization aid residues, or eliminating the fluidization aid altogether.

DISCLOSURE OF THE INVENTION

An object of this invention is to produce an amorphous or a nearly amorphous EPR in a fluidized bed at or above the sticking temperature of the EPR using a minimal amount of, or no, fluidization aid.

Other objects and advantages will become apparent hereafter.

According to the present invention, the above object is met by a process for the production of EPM or EPDM comprising contacting ethylene, propylene, and, optionally, one or more dienes, in a fluidized bed, at a temperature at or above the sticking temperature of the product resin, under polymerization conditions, with (i) prepolymer containing a transition metal catalyst with the proviso that the prepolymer is not sticky at the process temperature;
(ii) a hydrocarbyl aluminum and/or a hydrocarbyl aluminum halide cocatalyst; and, optionally,
(iii) a halogen containing promoter; and, optionally,
(iv) an inert particulate material having a mean particle size in the range of about 0.01 to about 150 microns wherein the particulate material is either contained in the prepolymer or is independent of the prepolymer, wherein the amount of prepolymer or the combined amount of prepolymer and inert particulate material are sufficient to essentially prevent agglomeration of the fluidized bed and the product resin.

DESCRIPTION OF THE PREFERRED EMBODIMENT(S)

The prepolymer used in the process of the invention is one which contains a transition metal catalyst, which is suitable for producing EPM and EPDM. This will include the Ziegler-Natta catalysts. These catalysts are exemplified by the vanadium, titanium, and chromium based catalysts described in U.S. Pat. Nos. 4,508,842; 4,302,565; 4,414,132; and 4,101,445, and can include spray dried catalysts. A technique for the prepolymerization of these types of catalysts can be found in U.S. Pat. No. 4,970,279. As noted above, the inert particulate material can be incorporated into the prepolymer or introduced into the fluidized bed reactor independently. Typically, the prepolymerization is carried out in the liquid phase in a similar manner to a diluent slurry polymerization. The catalyst system used in the prepolymerization is generally the same one that will be used in the fluidized bed polymerization. The difference lies in the monomers used and weight ratio of monomer(s) to catalyst precursor, which is at least about 10:1, and is typically about 50:1 to about 300:1. It should be pointed out that the numbers vary with the particular catalyst selected. The monomers and process conditions must be such that the prepolymer product per se is not sticky at the polymerization process temperatures, which are at or above the sticking temperature of the EPM or EPDM product. Examples of the prepolymers are homoprepolymers of ethylene, ethylene/propylene coprepolymers, ethylene/1-hexene coprepolymers, ethylene/propylene/1-hexene terprepolymers, and ethylene/propylene/diene terprepolymers, provided that they are of sufficiently high crystallinity or viscosity to be non-sticky.

The amount of prepolymer formed, in terms of grams of prepolymer per gram of catalyst precursor, generally depends on the composition of the prepolymer, the composition of the polymer being produced, and the productivity of the catalyst employed. The prepolymer loading is chosen so as to minimize the prepolymer residue in the product resin while still providing agglomeration protection. Stickier products generally require either higher initial loadings or higher residues in the product or both to provide equivalent agglomeration protection. More productive catalyst systems generally require higher initial loadings, but result in lower product residues at equivalent agglomeration protection. When using ethylene homoprepolymers or ethylene/propylene coprepolymers with, for example, a vanadium catalyst system, including a supported vanadium trihalide/electron donor reaction product as precursor with a modifier, a halocarbon promoter, and a hydrocarbyl aluminum cocatalyst, prepolymer loading can be in the range of about 10 to about 500 grams of prepolymer per gram of catalyst precursor and is preferably in the range of about 50 to about 300 grams of prepolymer per gram of catalyst precursor.

As noted above, the prepolymer is not sticky at the temperature at which the process is carried out. When used by itself, i.e., without the fluidization aid, the amount of prepolymer is sufficient to essentially prevent agglomeration of the fluidized bed, which is made up of resin particles, and the product resin. Preferably, the amount of prepolymer used in this case is limited to the amount which will provide about 3 to about 20 percent by weight of prepolymer in the product resin based on the weight of the product resin and is most-preferably kept in the range of about 3 to about 15 percent by weight. When the prepolymer is used together with the fluidization aid, the combined amount of prepolymer and inert particulate material (the fluidization aid) is sufficient to essentially prevent agglomeration of the fluidized bed, which is made up of resin particles, and the product resin. Preferably, the amount of prepolymer used in this embodiment of the process is limited to the amount which will provide about 1 to about 12 percent by weight of prepolymer in the product resin based on the weight of the product resin and is most preferably kept in the range of about 2 to about 8 percent by weight.

A typical vanadium based catalyst system useful in the preparation of the prepolymer and the EPM or EPDM product is comprised of (a) a vanadium compound or the reaction production of a vanadium compound and an electron donor as catalyst precursor; (b) a hydrocarbyl aluminum and/or a hydrocarbyl aluminum halide cocatalyst; and, optionally, (c) a halocarbon promoter. This system can be described in more detail as follows.

The vanadium compound can be any of the group of vanadium compounds well known to be useful as or in catalyst precursors in olefin polymerization processes. Examples are vanadium acetylacetonates, vanadium trihalides, vanadium tetrahalides, and vanadium oxyhalides. The halides are generally chlorides, bromides, or iodides, or mixtures thereof. More specific examples of these compounds are $VCl_3$, $VCl_4$, vanadium (acetylacetonate)$_3$, vanadyl triacetylacetonate, $VO(OC_2H_5)Cl_2$, $VOCl(OC_2H_5)_2$, $VO(OC_2H_5)_3$, and $VO(OC_4H_9)_3$.

The electron donor, if used in the catalyst precursor, is an organic Lewis base, liquid at temperatures in the range of about 0° C. to about 200° C., in which the vanadium compounds are soluble.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound.

A modifier, if used, can have the formula $BX_3$ or $AlR_{(3-a)}X_a$ wherein each R is an alkyl radical having 1 to 14 carbon atoms and is the same or different; each X is chlorine, bromine, or iodine and is the same or different; and a is 0, 1 or 2. While one or more modifiers can be used, two different modifiers are preferred. Preferred modifiers include alkylaluminum mono- and dichlorides wherein each alkyl radical has 1 to 6 carbon atoms, boron trichloride, and the trialkylaluminums. A particularly preferred modifier is diethylaluminum chloride. About 0.1 to about 10 moles, and preferably about 0.2 to about 2.5 moles, of modifier are used per mole of electron donor. The molar ratio of modifier to vanadium is in the range of about 1:1 to about 10:1 and is preferably in the range of about 2:1 to about 5:1.

Promoters are an optional component of the catalyst system. Chlorinated or perchlorinated esters are suitable promoters. Examples of these esters are $Cl_3CCOOC_2H_5$; $CCl_3CCl=CClCOOC_4H_9$; $C_6H_5CCl_2COOR$ wherein R is an alkyl radical having 1 to 8 carbon atoms; and $Cl_2C=CCl$—$CCl_2COOC_4H_9$. Other suitable halocarbon promoters have the following formula:

$R_yCX_{(4-y)}$ wherein R=hydrogen or an unsubstituted or halogen substituted alkyl radical having 1 to 6 carbon atoms;
X=a halogen; and
y=0, 1, or 2.

Preferred promoters of this group include fiouro-, chloro-, and bromo-substituted methane and ethane wherein there are at least two X atoms, e.g., methylene dichloride, 1,1,1-trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine.

Examples of hydrocarbyl aluminum compounds are as follows: triisobutylaluminum, trihexylaluminum, diisobutylaluminum hydride, dihexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as modifiers.

Where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethylzinc. A typical support is a solid, particulate, porous material essentially inert to the polymerization. It is used as a dry powder having an average particle size of about 10 to about 250 microns and preferably about 30 to about 100 microns; a surface area of at least 200 square meters per grmn and preferably at least about 250 square meters per gram; and a pore size of at least about 100 angstroms and preferably at least about 200 angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support is accomplished by mixing the precursor and silica gel in the electron donor solvent or other solvent followed by solvent removal under reduced pressure.

Where modifiers are used, they are usually dissolved in an organic solvent such as isopentane and impreg- A typical titanium based catalyst system comprises:

(a) a catalyst precursor having the formula $Mg_aTi(OR)_bX_c(ED)_d$ wherein

R is an aliphatic or aromatic hydrocarbon radical having 1 to 14 carbon atoms or COR' wherein R' is a aliphatic or aromatic hydrocarbon radical having 1 to 14 carbon atoms;

each OR group is the same or different;

X is independently chlorine, bromine or iodine;

ED is an electron donor;

a is 0.5 to 56;

b is 0, 1, or 2;

c is 2 to 116; and d is 2 to 85

(b) at least one modifier having the formula $BX_3$ or $AlR_{(3-b)}X_b$ wherein each R is alkyl or aryl and is the same or different, and X and b are as defined above for component (a).

wherein components (a) and (b) are impregnated into an inorganic support; and (c) a hydrocarbyl aluminum cocatalyst.

This titanium based catalyst system and its method for preparation are disclosed in U.S. Pat. No. 4,302,565. The precursor is prepared from a titanium compound, a magnesium compound, and an electron donor.

Titanium compounds, which are useful in preparing these precursors, have the formula $Ti(OR)_bX_e$ wherein R, X, and b are as defined above for component (a); e is an integer from 1 to 4; and b+e is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$.

The magnesium compounds, which are useful in preparing these precursors, include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the modifier, the support, and the hydrocarbyl aluminum cocatalyst are the same as those used in the vanadium based catalyst system described above.

The modifiers are usually dissolved in an inorganic solvent such as isopentane and impregnated into the support following impregnation of the titanium based complex, after which the catalyst precursor is dried. The cocatalyst is preferably added separately neat or as a solution in an inert solvent, such as isopentane, to the prepolymerization or the polymerization reaction at the same time as the flow of the ethylene is initiated.

The polymerization is conducted in the gas phase, preferably in a fluidized bed made up of particulate EPM or EPDM. The fluidized bed can be a stirred fluidized bed reactor or a fluidized bed reactor, which is not stirred. In terms of the fluidized bed, a superficial velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The ethylene partial pressure can be in the range of about 25 psi to about 350 psi and is preferably in the range of about 80 psi to about 250 psi. The gaseous feed streams of ethylene, propylene, and hydrogen are preferably fed to the reactor recycle line while liquid ethylidene norbornene or another diene, if used, and the cocatalyst solution are preferably fed directly to the fluidized bed reactor to enhance mixing and dispersion. Feeding liquid streams into the reactor recycle line can cause a rapid buildup of a fouling layer resulting in very poor reactor operation. The prepolymer containing the catalyst precursor and, optionally, the fluidization aid is transferred into the fluidized bed from the catalyst feeder. Where the fluidization aid is used and is independent of the prepolymer, it is introduced into the fluidized bed in the manner mentioned above. The composition of the EPM or EPDM product can be varied by changing the propylene/ethylene molar ratio in the gas phase and the diene concentration in the fluidized bed. The product is intermittently discharged from the reactor as the bed level builds up with polymerization. The production rate is controlled by adjusting the catalyst feed rate.

In some instances when feeding a prepolymerized catalyst where no fluidization aid is used, adjusting the catalyst feed rate to control the production rate can result in too little prepolymer residue to provide agglomeration protection. In these cases, it is found to be advantageous to adjust the production rate by introducing small amounts of a reversible catalyst poison while maintaining a higher prepolymer feed rate. In addition to increasing the prepolymer residue in the product resin, it is found that the reversible poison moderates prepolymer activity, poisons any catalyst sites on the prepolymer surface that could produce sticky resin, permits operation at higher C3/C2 molar ratios, and enhances tolerance to process upsets, all of which contribute to avoiding defluidization due to stickiness. For example, if the final product is an ethylene-propylene copolymer, introduction of about 0.5 to about 1.0 percent by weight based on the fluidized bed weight of ethylidene norbornene controls the prepolymer residue at the desired level for preventing agglomeration of about 3 to about 15 percent by weight.

The molar ratio of monomers in the reactor will be different for different catalyst systems, as is well-known to those skilled in the art. The propylene/ethylene molar ratio is adjusted to control the level of propylene incorporated into the terpolymer. For the vanadium catalyst described above, a range of about 0.35:1 to about 3:1 is preferred. The hydrogen/ethylene molar ratio is adjusted to control average molecular weights of the terpolymer. For the same catalyst system, a range of about 0.001:1 to about 0.2:1 is preferred. The level of diene in the bed, if used, is in the range of about 1 to about 15 weight percent based on the weight of the bed, and is preferably in the range of about 2 to about 10 weight percent. Examples of useful dienes, in addition to ethylidene norbornene (ENB), are 1,4-hexadiene and dicyclopentadiene dimer.

Additional steps can be taken to reduce agglomeration arising from causes other than softening temperature.

The product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

In the case where the prepolymer is being used without the fluidization aid, static can also be controlled by using small amounts of an inert conductive particulate material such as carbon black. The amount of inert particulate material is that which is sufficient to control static, but less than the minimum required for the material to act as a fluidization aid, i.e., about 0.5 to about 0.9 percent by weight based on the weight of the fluidized bed. Carbon black is the preferred antistatic material. The mean particle size of the inert conductive particulate material is in the range of about 0.01 to about 150 microns, preferably to about 10 microns. The mean particle size can refer to the particle per se or to an aggregate as in the case of carbon black. The carbon black materials employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures.

The advantage of one embodiment of the above-described process lies in the synergistic effects of having both prepolymer and fluidization aid. One synergistic effect relates to agglomeration protection. The fluidization aid provides its least protection early in the growth of the polymer particle before an adequate protective coating has been established. However, this is just when the prepolymer shell is thickest, and thus provides its maximum agglomeration protection. Conversely, the prepolymer provides least protection late in the growth of the polymer particle, when the shell may thin and allow sticky resin to come to the surface. However, this is just when the fluidization aid has had maximum time to form its protective coating and is therefore most effective. Another synergistic effect relates to catalyst productivity. High prepolymer residues are not desirable in the final product because they impose a limitation on catalyst productivity. Higher productivities can therefore be achieved, while still maintaining agglomeration protection, by using small quantities of fluidization aid. Similarly, high fluidization aid residues are not desirable in the final product because they negatively impact polymer properties. Lower fluidization aid residues can be achieved while still maintaining agglomeration protection by using a prepolymerized catalyst. Therefore the combination of fluidization aid with prepolymerized catalyst offers both high productivity and low residues not achievable with either one alone.

The residence time of the mixture of comonomers, resin, catalyst, and liquid in the fluidized bed can be in the range of about 1.5 to about 8 hours and is preferably in the range of about 2 to about 4 hours. The final EPM or EPDM product can contain the following amounts of reacted comonomers: about 35 to about 80 percent by weight ethylene; about 18 to about 50 percent by weight propylene; and about 0 to about 15 percent by weight diene. The crystallinity, also in weight percent based on the total weight of the EPM or EPDM, can be in the range of zero (essentially amorphous) to about 10 percent by weight (nearly amorphous). The Mooney viscosity can be in the range of about 20 to about 150 and is preferably about 30 to about 100. The Mooney viscosity is measured by introducing the EPM or EPDM into a vessel with a large rotor, preheating for one minute at 100° C. and then stirring for four minutes at the same temperature. The viscosity is measured at 100° C. in the usual manner.

The fluidized bed reactor can be the one described in U.S. Pat. No. 4,482,687 or another conventional reactor for the gas phase production of, for example, polyethylene. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas is comprised of ethylene, nitrogen, hydrogen, and propylene, either alone or in combination. The process can be carded out in a batch or continuous mode, the latter being preferred. The essential parts of the first reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the reactor to improve the fill level of the product discharge vessel.

The advantages of the process in which the prepolymer is used without the fluidization aid are: (i) the prepolymer provides protection against agglomeration and allows operation of the fluidized bed above the sticking point of the polymer without the use of fluidization aid; and (ii) the EPR product has a better morphology than that produced by the standard unprepolymerized catalyst precursor, i.e., the resin product particles have a more spherical geometry and less surface asperities.

The advantages of the process in which the prepolymer is used together with the fluidization aid are: (i) antiagglomeration protection is provided at two crucial stages of the growth of the sticky EPR particles, i.e., the prepolymer provides protection against agglomeration in the early stages of the polymerization process and the fluidization aid provides protection in the later stages of the process; (ii) lower residues of the prepolymer and the fluidization aid are achieved because the two components complement each other in providing the protection against agglomeration; and (iii) white fluidization aids permit the production of colorable EPR products.

The patent application and patents mentioned in this application are incorporated by reference herein.

The invention is illustrated by the following examples:

EXAMPLES

In the examples, two reactors are used, alternatively, to carry out the polymerization on different scales. They are referred to as Reactor A and Reactor B.

Reactor A is a one liter, jacketed, stirred autoclave reactor and Reactor B is a fluidized bed reactor, similar to the fluidized bed reactor described above, having an inner diameter of about 18 inches.

The catalyst system used in each of these reactors includes a vanadium based catalyst precursor, triisobutylaluminum (TIBA) as a cocatalyst, and chloroform ($CHCl_3$) as a promoter. The catalyst precursor is prepared using conventional procedures such as the procedure described in U.S. Pat. No. 4,508,842, i.e., vanadium trichloride and an electron donor are supported on dehydrated silica followed by a modification step to reduce the supported precursor with diethylaluminum chloride (DEAC). The catalyst system is then prepolymerized in a slurry prepolymerizer with ethylene or ethylene and propylene to the desired level of prepolymer. It is believed that the ethylene homoprepolymer or the ethylene/propylene coprepolymer forms a shell around the catalyst precursor.

EXAMPLE 1

Prepolymerization

A catalyst precursor is prepared, as above, from vanadium trichloride ($VCl_3$), dehydrated silica, and diethylaluminum chloride (DEAC) with a composition of 0.43 millimole of $VCl_3$ per gram of catalyst precursor, an excess of tetrahydrofuran (THF), and 1.3 millimole of DEAC per gram of catalyst precursor. A 125 gallon prepolymerization vessel, as described above, is charged with 70 gallons of isopentane followed by 2 kilograms of a 20 weight percent solution of triisobutylaluminum (TIBA)in isopentane. The mixture is heated to 50° C. for one hour to promote the reaction of the TIBA with any water present in the isopentane. After heating is complete, the batch is cooled to below 25° C., 240 grams of chloroform are added as catalyst promoter, immediately followed by 1.5 kilograms of catalyst precursor.

Prepolymerization is then started by pressuring the reactor to 30 psig with ethylene. Polymerization begins within 5 minutes, as evidenced by the steady feed of ethylene required to maintain the reactor pressure and by an increase in the reaction temperature to 30° C. The reactor pressure is gradually increased to 50 psig, and the reaction temperature is gradually increased to 50° C. After sufficient ethylene has been fed to give a theoretical prepolymer loading of 100 grams of polymer per gram of supported catalyst, the feed is then stopped and the remaining monomer in the reactor allowed to react. When the reactor pressure reaches a steady value and the batch has cooled to 30° C., the agitator is shut off, the polymer allowed to settle, and the supernatant liquid removed by a dip tube. Remaining isopentane is removed by heating the batch to 40° C. at 0 psig with a nitrogen sparge. The dried prepolymer is screened through a 20 mesh screen kept inert by a nitrogen purge, and 173 pounds of screened prepolymer are collected.

Polymerization

About 200 grams of sodium chloride are dried under vacuum at 115° C. for at least 12 hours. Reactor A is initially purged with nitrogen and heated to an internal temperature of 100° C. for at least 15 minutes under a slow, continuous purge of nitrogen. The reactor is then cooled to 85° C. and the salt is taken from the vacuum oven while hot and added to the reactor through a 0.5 inch port under a nitrogen flow. The salt bed is stirred at 300 rpm (revolutions per minute) and purged with nitrogen for an additional 15 minutes. The reactor jacket is then cooled to 50° C.

At a jacket temperature of 50° C., prepolymerized catalyst containing approximately 0.03 millimole of vanadium is added to the reactor through the 0.50 inch port from a glass addition tube kept under nitrogen while maintaining a 150 rpm agitation of the bed. TIBA, as a 25 weight percent solution in hexane, and $CHCl_3$, as a 1 molar solution in hexane, are charged to a nitrogen purged 4 ounce bottle in a 50:1 Al/V mole ratio and a 1:1 Al/$CHCl_3$ mole ratio. This mixture is charged to the reactor and the 0.5 inch port is tightly capped. The reactor is purged briefly with nitrogen through the vent line, sealed, and the stirring speed increased to 300 rpm.

An initial quantity of 0.5 milliliters of ENB is fed to the reactor at a rate of 0.5 milliliters per minute. At the same time, a mixture of ethylene, propylene, and hydrogen with a C3/C2 molar ratio of 1.5 and an $H_2$/C2 ratio of 0.001 is fed to the reactor at an ethylene flow rate of 2.5 liters per minute until the reactor pressure reaches 120 psig, at which point the flow rate drops to near zero momentarily. As the polymerization reaction commences, the flow rate of the gas mixture, as well as the reactor temperature, increases. At this point, the hydrogen feed is turned off, the C3/C2 molar ratio is adjusted downward to a value of 0.44, the ENB feed is adjusted to a rate of 0.05 milliliter per minute and the jacket temperature is adjusted to bring the internal reactor temperature to 65° C. The monomers are fed on demand for 105 minutes, and the reaction is then terminated by stopping the flow of monomers and reducing the temperature of the reactor.

The reactor is vented, cooled, purged with nitrogen, and opened to take out the mixture of salt and polymer product. The salt is washed out with water to obtain about 60 grams of granular resin containing residual prepolymer. The residual amount of prepolymer in the resin and the catalyst productivity are determined by mass balance, and the polymer composition is determined by NMR (nuclear magnetic resonance) analysis. The properties are set forth in the Table. Granular EPDM is obtained containing 13 percent by weight prepolymer.

EXAMPLE 2

Example 1 is repeated except that the polymerization reactor is charged with 0.017 millimole of vanadium, and the polymerization is conducted for 130 minutes. Granular EPDM is obtained containing 6 percent by weight prepolymer.

EXAMPLE 3

Example 1 is repeated except that the prepolymerization is continued to a 55 gram/gram loading. The polymerization is conducted, using a charge of 0.037 millimole of vanadium, for 40 minutes. Granular EPDM is obtained containing 11 percent by weight prepolymer.

EXAMPLE 4

Example 3 is repeated except that the polymerization is conducted for 100 minutes. The resin is agglomerated and granular EPDM is not obtained. The agglomerated resin contains 6 percent by weight prepolymer. This example shows that the prepolymer residue level that prevents agglomeration for the catalyst of example 1 is not adequate for the catalyst of example 3.

EXAMPLE 5

Example 1 is repeated except that the polymerization is carried out in Reactor B at a temperature of 60° C. and a C3/C2 molar ratio of 0.50. No ENB is fed to the reactor. Small amounts of carbon black are fed to the reactor to prevent static.

The process is operable and granular EPDM is obtained containing 31 weight percent propylene; 3 weight percent residual prepolymer; and 0.7 weight percent carbon black.

EXAMPLE 6

Example 1 is repeated except that the prepolymerization is carried out with a mixture of propylene and ethylene. The prepolymerized catalyst contains 2.7 weight percent propylene. Polymerization is performed in Reactor B at a temperature of 60° C.; an $H_2/C2$ molar ratio of 0.005; and C3/C2 molar ratio of 0.82. ENB is fed at a rate of 50 cubic centimeters per hour and small amounts of carbon black are fed to the reactor to prevent static. The process is operable and granular EPDM is obtained containing 40 weight percent propylene; 0.5 weight percent ENB; 12 weight percent residual prepolymer; and 0.8 weight percent carbon black.

EXAMPLE 7

Prepolymerization

A catalyst precursor is prepared, as above, from vanadium trichloride ($VCl_3$), dehydrated silica, and diethylaluminum chloride (DEAC) with a composition of 0.43 millimole of $VCl_3$ per gram of catalyst precursor, excess tetrahydrofuran (THF), and 1.3 millimole of DEAC per gram of catalyst precursor. A 125 gallon prepolymerization vessel, as described above, is charged with 70 gallons of isopentane followed by 2 kilograms of a 20 weight percent solution of triisobutylaluminum (TIBA) in isopentane. The mixture is heated to 50° C. for one hour to promote the reaction of the TIBA with any water present in the isopentane. After heating is complete, the batch is cooled to below 25° C., 240 grams of chloroform are added as catalyst promoter, immediately followed by 1.5 kilograms of catalyst precursor.

Prepolymerization is then started by pressuring the reactor to 30 psig with ethylene. Polymerization begins within 15 minutes, as evidenced by the steady feed of ethylene required to maintain the reactor pressure and by an increase in the reaction temperature to 30° C., and propylene feed is then begun. The propylene feed rate is controlled with a metering valve to maintain a 0.02 propylene: ethylene weight ratio. The reactor pressure is gradually increased to 50 psig, and the reaction temperature is gradually increased to 50° C. over 6 hours. After 6 hours, 77.3 kilograms of ethylene and 1.45 kilograms of propylene have been fed, to give a theoretical prepolymer loading of 50 grams of polymer per gram of supported catalyst. The feeds are then stopped and the remaining monomers in the reactor allowed to react. When the reactor pressure reaches a steady value and the batch has cooled to 30° C., the agitator is shut off, the polymer allowed to settle, and the supernatant liquid removed by a dip tube. Remaining isopentane is removed by heating the batch to 40° C. at 0 psig with a nitrogen sparge. The dried prepolymer is screened through a 20 mesh screen kept inert by a nitrogen purge, and 173 pounds of screened prepolymer are collected.

Polymerization

About 200 grams of sodium chloride are mixed with 1 gram of silica having an average aggregate size of 12 microns and a surface area of 140 square meters per gram, and dried under vacuum at 115° (: for at least 12 hours. Reactor A is initially purged with nitrogen and heated to an internal temperature of 100° C. for at least 15 minutes under a slow, continuous purge of nitrogen. The reactor is then cooled to 85° C. and the salt/silica mixture is taken from the vacuum oven while hot and added to the reactor through a 0.5 inch port under a nitrogen flow. The salt bed is stirred at 300 rpm (revolutions per minute) and purged with nitrogen for an additional 15 minutes. The reactor jacket is then cooled to 50° C.

At a jacket temperature of 50° C., prepolymerized catalyst containing approximately 0.03 millimole of vanadium is added to the reactor through the 0.50 inch port from a glass addition tube kept under nitrogen while maintaining a 150 rpm agitation of the bed. TIBA, as a 25 weight percent solution in hexane, and $CHCl_3$, as a 1 molar solution in hexane, are charged to a nitrogen purged 4 ounce bottle in a 50:1 Al/V mole ratio and a 1:1 $Al/CHCl_3$ mole ratio, along with an additional 0.4 millimole of TIBA per gram of silica to further passivate the fluidization aid. This mixture is charged to the reactor and the 0.5 inch port is tightly capped. The reactor is purged briefly with nitrogen through the vent line, sealed, and the stirring speed increased to 300 rpm.

An initial quantity of 0.5 milliliters of ENB is fed to the reactor at a rate of 0.5 milliliters per minute. At the same time, a mixture of ethylene, propylene, and hydrogen with a C3/C2 molar ratio of 1.5 and an $H_2/C2$ ratio of 0.001 is fed to the reactor at an ethylene flow rate of 2.5 liters per minute until the reactor pressure reaches 120 psig, at which point the flow rate drops to near zero momentarily. As the polymerization reaction commences, the flow rate of the gas mixture, as well as the reactor temperature, increases. At this point, the hydrogen feed is turned off, the C3/C2 molar ratio is adjusted downward to a value of 0.44, the ENB feed is adjusted to a rate of 0.05 milliliter per minute and the jacket temperature is adjusted to bring the internal reactor temperature to 65° C. The monomers are fed on demand for 90 minutes, and the reaction is then terminated by stopping the flow of monomers and reducing the temperature of the reactor.

The reactor is vented, cooled, purged with nitrogen, and opened to take out the mixture of salt, fluidization aid, and polymer product. The salt is washed out with water to obtain about 86 grams granular resin containing fluidization aid and prepolymer. The residual amounts of fluidization aid and prepolymer in the resin, and the catalyst productivity, are determined by mass balance, and the polymer composition is determined by NMR (nuclear magnetic resonance) analysis. The properties are set forth in the Table. Granular EPDM is obtained containing 5 percent by weight prepolymer and 1.5 percent by weight fluidization aid.

EXAMPLE 8

Example 7 is repeated except that no silica is mixed with the salt prior to charging to the reactor. After workup, 72 grams of resin containing prepolymer only is obtained with the properties set forth the Table.

However, the resin is severely agglomerated and has to be scraped from the reactor surface. Granular EPDM is not obtained. The EPDM contains 6 percent by weight prepolymer; but no fluidization aid. This shows that low levels of residual prepolymer are not in themselves capable of providing adequate agglomeration protection under these polymerization conditions.

EXAMPLE 9

Example 7 is repeated except that the catalyst precursor contains approximately 0.92 millimole of vanadium per gram of catalyst precursor. The catalyst precursor is then prepolymerized to a prepolymerized catalyst precursor containing approximately 0.017 millimole of vanadium per gram of prepolymer.

Polymerization is conducted for 45 minutes.

After workup, 34 grams of granular resin containing prepolymer and fluidization aid is obtained with the properties set forth in the Table. Granular EPDM is obtained containing 6 percent by weight prepolymer and 3 percent by weight fluidization aid.

EXAMPLE 10

Example 9 is repeated except that the polymerization is continued for 100 minutes and 2 grams of silica are mixed with the salt. After workup, 71 grams of resin containing fluidization aid and prepolymer is obtained with the properties set forth in the Table. Granular EPDM is obtained containing 3 percent by weight prepolymer and 3 percent by weight fluidization aid. This shows the synergism between prepolymer residue and residual fluidization aid. Lower prepolymer residues, and thus higher catalyst productivity, can be achieved by an increase in the residual fluidization aid.

EXAMPLE 11

Example 10 is repeated except that 1 gram of silica is mixed with the salt. After workup, 65 grams of resin containing prepolymer and fluidization aid is obtained with the .properties set forth in the Table. However, the resin is severely agglomerated and has to be scraped from the reactor surface. Granular EPDM is not obtained. The product contains 3 percent by weight prepolymer and 1.5 percent by weight fluidization aid. This shows that, at this lower prepolymer residue, higher amounts of fluidization aid are needed than are needed with a higher prepolymer residue as in Example 1.

EXAMPLE 12

Example 7 is repeated except that the prepolymerization is continued until 110 grams of olefin reacts per one gram of catalyst precursor. The resulting prepolymerized catalyst precursor contains 3 percent by weight propylene and 0.0039 millimole of vanadium per gram of prepolymer.

The prepolymerized catalyst precursor is added to the reactor; 6 grams of silica are mixed with the salt; the polymerization is conducted for 70 minutes; and the $H_2/C_2$ molar ratio is 0.012. After workup, 115 grams of resin containing prepolymer and fluidization aid is obtained with the properties set forth in the Table. Granular EPDM is obtained. The product contains 5 percent by weight prepolymer and 5 percent by weight fluidization aid. This shows that adequate agglomeration protection can be achieved when producing a lower molecular weight, stickier, resin by increasing the residual level of fluidization aid.

EXAMPLE 13

Example 12 is repeated except that 2 grams of silica are mixed with salt. After workup, 90 grams of resin containing prepolymer and fluidization aid is obtained with the properties set forth in the Table. The resin is severely agglomerated and has to be scraped from the reactor surface. Granular EPDM is not obtained. The product contains 5 percent by weight prepolymer and 2 percent by weight fluidization aid. This shows that residual levels of prepolymer and fluidization aid that are adequate for high molecular weight products are not adequate for lower molecular weight, stickier, products.

TABLE

| EXAMPLE | 7 | 8 | 9 | 10 | 11 | 12 | 13 |
|---|---|---|---|---|---|---|---|
| Wt % C3 | 32 | 33 | 37 | 34 | 34 | 34 | 34 |
| Wt % ENB | 3 | 3 | 2 | 2 | 2 | — | — |
| Melt Index (g/10 min) | — | — | — | — | — | 15 | 14 |
| Cat. Prod. (g/g) | 1010 | 900 | 890 | 1900 | 1725 | 2800 | 2200 |
| Prepolymer residue (%) | 5 | 6 | 6 | 3 | 3 | 4 | 5 |
| Fluidization aid residue (%) | 1.5 | 0 | 3 | 3 | 1.5 | 5 | 2 |
| Morphology | granular | agglomerated | granular | granular | agglomerated | granular | agglomerated |

Notes to Table:
1. Wt % C3 is the percent by weight of propylene based on the weight of the EPDM product as determined by NMR analysis.
2. Wt % ENB is the percent by weight of ethylidene norbornene based on the weight of the EPDM product as determined by NMR analysis.
3. Melt index (g/10 min) is determined under ASTM D-1238, Condition E, at 190° C. and 2.16 kilograms. It is reported in grams per 10 minutes.
4. Cat Prod (g/g) is the catalyst productivity based on the grams of EPDM per gram of catalyst precursor.
5. Prepolymer residue (%) is the percent by weight prepolymer based on the weight of the EPDM product.
6. Fluidization aid residue (%) is the percent by weight fluidization aid based on the weight of the EPDM product.
7. Morphology is the structural form of the EPDM product, i.e., granular or agglomerate.

EXAMPLE 14

A prepolymerized catalyst is prepared as in Example 7 except that the prepolymerization is conducted without propylene and continued to about a 100 gram per gram loading. Polymerization is then performed in Reactor B, a fluid bed reactor, at a temperature of 60° C.; an $H_2/C_2$ molar ratio of 0.0011; and a C3/C2 molar ratio of 0.80. Carbon black is fed to the reactor as a fluidization aid. The process is operable and granular EPDM is obtained containing 30 weight percent C3; 2.6 weight percent ENB; 11 weight percent residual prepolymer; and 5 weight percent fluidization aid.

EXAMPLE 15

A prepolymerized catalyst is prepared as in Example 14 except that the prepolymerization is continued to about a 60 gram per gram loading. Polymerization is performed under the same conditions as in Example 8 using carbon black as a fluidization aid. The process is operable and granular EPDM is obtained containing 33 weight percent C3; 37 weight percent ENB; 10 weight percent residual prepolymer; and 6 weight percent fluidization aid.

EXAMPLE 16

This example involves the preparation of a prepolymer containing a fluidization aid. A catalyst is prepared as in Example 7 except that following aluminum alkyl addition to the reactor, 800 grams of carbon black, dried at 120° C. for 12 hours, are added as an isopentane slurry. The prepolymerization is then continued to a 50 gram per gram of catalyst loading. The screened prepolymer is a free flowing gray powder.

We claim:

1. A process for the production of sticky EPM or EPDM comprising contacting monomers ethylene, propylene, and, optionally, one or more dienes, in a gas phase fluidized bed, at a temperature at or above the sticking temperature of the product resin, under polymerization conditions, with
   (i) a prepolymer containing a silica supported transition metal catalyst precursor with the proviso that the prepolymer is not sticky at the process temperature;
   (ii) a hydrocarbyl aluminum and/or a hydrocarbyl aluminum halide cocatalyst, and, optionally,
   (iii) a halogen containing promoter; and, optionally,
   (iv) an inert particulate material having a mean particle size in the range of about 0.01 to about 150 microns wherein the particulate material is either contained in the prepolymer or is independent of the prepolymer,
   wherein the amount of prepolymer or the combined amount of prepolymer and inert particulate material is sufficient to essentially prevent agglomeration of the fluidized bed and the product resin.

2. The process defined in claim 1 wherein the amount of prepolymer used in the process is limited to that amount which will provide about 3 to about 20 percent by weight of prepolymer in the product resin based on the weight of the product resin.

3. The process defined in claim 1 wherein the prepolymer is a homopolymer of ethylene or a copolymer of ethylene and propylene.

4. The process defined in claim 1 wherein the catalyst precursor is a vanadium compound or the reaction product of a vanadium compound and an electron donor, said precursor being (i) unsupported or supported and (ii) unmodified or modified with a modifier having the formula $BX_3$ or $AlR_{(3-a)}X_a$ wherein each R is independently an alkyl radical having 1 to 14 carbon atoms; each X is independently chlorine, bromine or iodine; and a is 0, 1, or 2.

5. The process defined in claim 1 wherein the monomers are ethylene and propylene.

6. The process defined in claim 1 wherein the monomers are ethylene, propylene, and a diene.

7. A process for the production of a sticky EPDM comprising contacting ethylene, propylene, and a diene in a gas phase fluidized bed, at a temperature at or above the sticking temperature of the product EPDM, under polymerization conditions, with
   (i) a prepolymer which is either a homopolymer of ethylene or a copolymer of ethylene and propylene with the proviso that (a) the prepolymer is not sticky at the process temperature and (b) the amount of prepolymer used in the process is limited to that amount which will provide about 3 to about 15 percent by weight of prepolymer in the product EPDM based on the weight of the product EPDM and is sufficient to essentially prevent agglomeration of the fluidized bed and the product resin, said prepolymer containing a silica supported vanadium based catalyst precursor, which, optionally, contains an electron donor, a support, and/or a modifier having the formula $BX_3$ or $AlR_{(3-a)}X_a$ wherein each R is independently an alkyl radical having 1 to 14 carbon atoms; each X is independently chlorine, bromine, or iodine; and a is 0, 1, or 2;
   (ii) a hydrocarbyl aluminum and/or a hydrocarbyl aluminum halide co catalyst; and
   (iii) a halocarbon promoter.

* * * * *